US009355137B2

(12) United States Patent
Mori et al.

(10) Patent No.: US 9,355,137 B2
(45) Date of Patent: May 31, 2016

(54) DISPLAYING ARTICLES MATCHING A USER'S INTEREST BASED ON KEY WORDS AND THE NUMBER OF COMMENTS

(71) Applicant: YAHOO JAPAN CORPORATION, Tokyo (JP)

(72) Inventors: Takeshi Mori, Tokyo (JP); Shigetoshi Okuyama, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 192 days.

(21) Appl. No.: 13/962,400

(22) Filed: Aug. 8, 2013

(65) Prior Publication Data
US 2014/0068399 A1  Mar. 6, 2014

(30) Foreign Application Priority Data

Sep. 4, 2012  (JP) ................................. 2012-194399

(51) Int. Cl.
*G06F 17/22* (2006.01)
*G06F 17/30* (2006.01)

(52) U.S. Cl.
CPC ...... *G06F 17/30386* (2013.01); *G06F 17/2247* (2013.01); *G06F 17/30699* (2013.01); *G06F 17/30867* (2013.01)

(58) Field of Classification Search
CPC .......... G06F 17/30867; G06F 17/2247; G06F 17/30699; G06F 17/30386
See application file for complete search history.

(56) References Cited

U.S. PATENT DOCUMENTS

| 5,857,179 | A  | * | 1/1999  | Vaithyanathan et al. |
| 6,167,397 | A  | * | 12/2000 | Jacobson et al. |
| 7,464,086 | B2 | * | 12/2008 | Black ..................... G06Q 30/02 |
| 8,209,616 | B2 | * | 6/2012  | Stefik .................. G06F 17/3089 707/708 |
| 8,374,975 | B1 | * | 2/2013  | Cierniak et al. ................ 706/12 |

(Continued)

FOREIGN PATENT DOCUMENTS

| JP | A-2006-139717 | 6/2006 |
| JP | A-2006-309515 | 11/2006 |

(Continued)

OTHER PUBLICATIONS http://help.yahoo-help.jp/app/answers/detail/p/575/a_id/4411, Jun. 14, 2012 (with translation).

(Continued)

*Primary Examiner* — Cesar Paula
*Assistant Examiner* — Tyler J Schallhorn
(74) *Attorney, Agent, or Firm* — Oliff PLC

(57) ABSTRACT

An information processing device includes an article acquisition unit that acquires articles indicated as data, a theme setting unit that sets a theme and an extraction condition of an article included in the theme, a selection unit that receives selection of the set theme by a user, an article extraction unit that extracts an article included in the set theme from the articles acquired by the article acquisition unit based on the extraction condition corresponding to the theme, a posting reception unit that receives posting of a comment corresponding to the article extracted by the article extraction unit from the user, a transmission unit that transmits the posted comment to the user selecting the theme including the article, and a condition update unit that updates the extraction condition of the article corresponding to the theme according to an amount of comment posted for each of the articles.

7 Claims, 7 Drawing Sheets

(56) References Cited

U.S. PATENT DOCUMENTS

| | | | |
|---|---|---|---|
| 8,825,650 B2* | 9/2014 | Thompson et al. | 707/737 |
| 8,826,125 B2* | 9/2014 | Chu | G06F 17/30867 707/602 |
| 8,880,546 B1* | 11/2014 | Trauth | 707/765 |
| 9,116,983 B2* | 8/2015 | Ameri-Yahia | G06F 17/2785 |
| 2002/0035573 A1* | 3/2002 | Black | G06Q 30/02 |
| 2008/0262998 A1* | 10/2008 | Signorini et al. | 707/2 |
| 2009/0070346 A1* | 3/2009 | Savona et al. | 707/100 |
| 2011/0035381 A1* | 2/2011 | Thompson et al. | 707/740 |
| 2012/0078719 A1* | 3/2012 | Bhagwan et al. | 705/14.54 |
| 2013/0212059 A1* | 8/2013 | Ameri-Yahia | G06F 17/30713 706/52 |
| 2013/0238989 A1* | 9/2013 | Chu | G06F 17/30867 715/273 |
| 2013/0332523 A1* | 12/2013 | Luu | 709/204 |
| 2015/0189347 A1* | 7/2015 | Oztaskent | H04N 21/2665 725/32 |

FOREIGN PATENT DOCUMENTS

| | | |
|---|---|---|
| JP | A-2007-287053 | 11/2007 |
| JP | A-2008-210392 | 9/2008 |
| JP | A-2008-234317 | 10/2008 |
| JP | A-2011-507079 | 3/2011 |
| WO | WO 2009/073856 A1 | 6/2009 |

OTHER PUBLICATIONS http://gendai.ismedia.jp/articles/-/28154, Jul. 31, 2013.
http://youtu.be/Bnr6QKKcsII, Aug. 8, 2013 (video).
Shine on the Web, http://www.scoop.it/, Jul. 31, 2013.

* cited by examiner

FIG.3

| ARTICLE ID | URL | TITLE | TEXT |
|---|---|---|---|
| K125 | http://aaa... | PROS AND CONS... | THE GOVERNMENT CURRENTLY IN THE NATIONAL ASSEMBLY... |
| K126 | http://bbb... | OF CONTAMINATION... | SERIES OF RUMORS... |
| ... | ... | ... | ... |

FIG.4

| THEME ID | TITLE OF THEME | EXTRACTION CONDITION |
|---|---|---|
| TH1 | NUCLEAR POWER PROBLEMS | (RADIOACTIVITY or BECQUEREL) and (TOKYO ELECTRIC POWER COMPANY or ...) (HARMFUL RUMOR or MEASUREMENT) and (PRECIPITATION or CONDENSATION) ... |
| TH2 | HIGH SCHOOL BASEBALL | (KOUSHIEN or HIGH SCHOOL BASEBALL PLAYER) and (...) |
| ... | ... | ... |

FIG.5

| USER ID | SELECTED THEME |
|---|---|
| U5123 | TH1 (NUCLEAR POWER PROBLEMS), TH2 (HIGH SCHOOL BASEBALL) |
| U5257 | TH2 (HIGH SCHOOL BASEBALL) |
| ... | ... |

| | THEME ID | TARGET ARTICLE ID |
|---|---|---|
| TH1 | NUCLEAR POWER PROBLEMS | K125, K177, K268, K310... |
| TH2 | HIGH SCHOOL BASEBALL | K137, K296, K299... |
| | ... | ... |

FIG.8

| COMMENT ID | TARGET ARTICLE ID | COMMENT TEXT |
|---|---|---|
| C388 | K125 | PREVIOUSLY THE SAME THING... |
| C389 | K127 | RESPONSIBILITIES OF THE POLITICAL PARTY... |
| ... | ... | ... |

DISPLAYING ARTICLES MATCHING A USER'S INTEREST BASED ON KEY WORDS AND THE NUMBER OF COMMENTS

CROSS-REFERENCE TO RELATED APPLICATIONS

The present application claims priority to and incorporates by reference the entire contents of Japanese Patent Application No. 2012-194399 filed in Japan on Sep. 4, 2012.

BACKGROUND OF THE INVENTION

1. Field of the Invention

The present invention relates to browse of articles via a communication network.

2. Description of the Related Art

In recent years, not only users read articles such as news on the Internet, but users also actively perform activities to transmit information by themselves or exchange information with other users. For example, a comment function on news articles according to one conventional technology allows users to post and browse comments on specific individual news articles.

Further, machine retrieval has been suggested to retrieve specific individual articles and remarks regarding the articles on blogs or the like based on keywords designated by users, and displays the retrieved articles together with the retrieved remarks in an associated manner (for example, see Japanese Patent Application Laid-open No. 2006-309515).

Furthermore, in a social networking service (SNS) (for example, see Japanese National Publication of International Patent Application No. 2011-507079), users can exchange information on a topic of their mutual interests with someone they know in the real world by registering them as friends on the SNS. User of a mini-blog can appropriately choose persons to follow so that comments to be displayed in a timeline are those match with his/her own interests.

However, the news comment function is used separately for each article. When different articles exist on the same topic, users have to write comment for each article and read comments of each article separately. Further, when the machine retrieval is employed, it is usually difficult to obtain an intended result only by word search, irrespective of target fields. Thus, the articles obtained by machine retrieval seldom match with the interest of users.

In a case of the SNS, users communicate with a very limited number of people, i.e., people whom they know in the real world. Thus, there is only a limited possibility that they share same interest and concern among various themes in the world.

SUMMARY OF THE INVENTION

It is an object of the present invention to at least partially solve the problems in the conventional technology.

According to one aspect of an embodiment of the present invention, an information processing device includes: an article acquisition unit that acquires articles indicated as data; a theme setting unit that sets a theme and an extraction condition of an article included in the theme, based on at least one of the acquired articles; a selection unit that receives selection of the set theme by a user; an article extraction unit that extracts an article included in the set theme from the articles acquired by the article acquisition unit based on the extraction condition corresponding to the theme; a posting reception unit that receives posting of a comment corresponding to the article extracted by the article extraction unit from the user; a transmission unit that transmits the posted comment to the user selecting the theme including the article; and a condition update unit that updates the extraction condition of the article corresponding to the theme according to an amount of comment posted for each of the articles.

According to another aspect of an embodiment of the present invention, an information processing method causing a computer to execute: acquiring articles indicated as data; setting a theme and an extraction condition of an article included in the theme, based on at least one of the acquired articles; receiving selection of the set theme by a user; extracting an article included in the set theme from the articles acquired in the acquiring based on the extraction condition corresponding to the theme; receiving posting of a comment corresponding to the article extracted in the extracting of the article from the user; transmitting the posted comment to the user selecting the theme including the article; and updating the extraction condition of the article corresponding to the theme according to an amount of comment posted for each of the articles.

According to still another aspect of an embodiment of the present invention, a non-transitory computer-readable storage medium with an executable program stored thereon, wherein the program instructs a processor to perform: acquiring articles indicated as data; setting a theme and an extraction condition of an article included in the theme, based on at least one of the acquired articles; receiving selection of the set theme by a user; extracting an article included in the set theme from the acquired articles based on the extraction condition corresponding to the theme; receiving posting of a comment corresponding to the extracted article from the user; transmitting the posted comment together with the article to the user selecting the theme including the article; and updating the extraction condition of the article corresponding to the theme according to an amount of comment posted for each of the articles.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of data according to the embodiment of the invention;

FIG. 4 is a diagram illustrating an example of data according to the embodiment of the invention;

FIG. 5 is a diagram illustrating an example of data according to the embodiment of the invention;

FIG. 8 is a diagram illustrating an example of data according to the embodiment of the invention;

DETAILED DESCRIPTION OF THE PREFERRED EMBODIMENTS

Hereinafter, modes (referred to as "embodiments") for carrying out the present invention will be exemplified with reference to the drawings. The assumption factors common to the details described above in the technical background, the problems, and the like will be appropriately omitted.

1. Configuration

Figure 1:
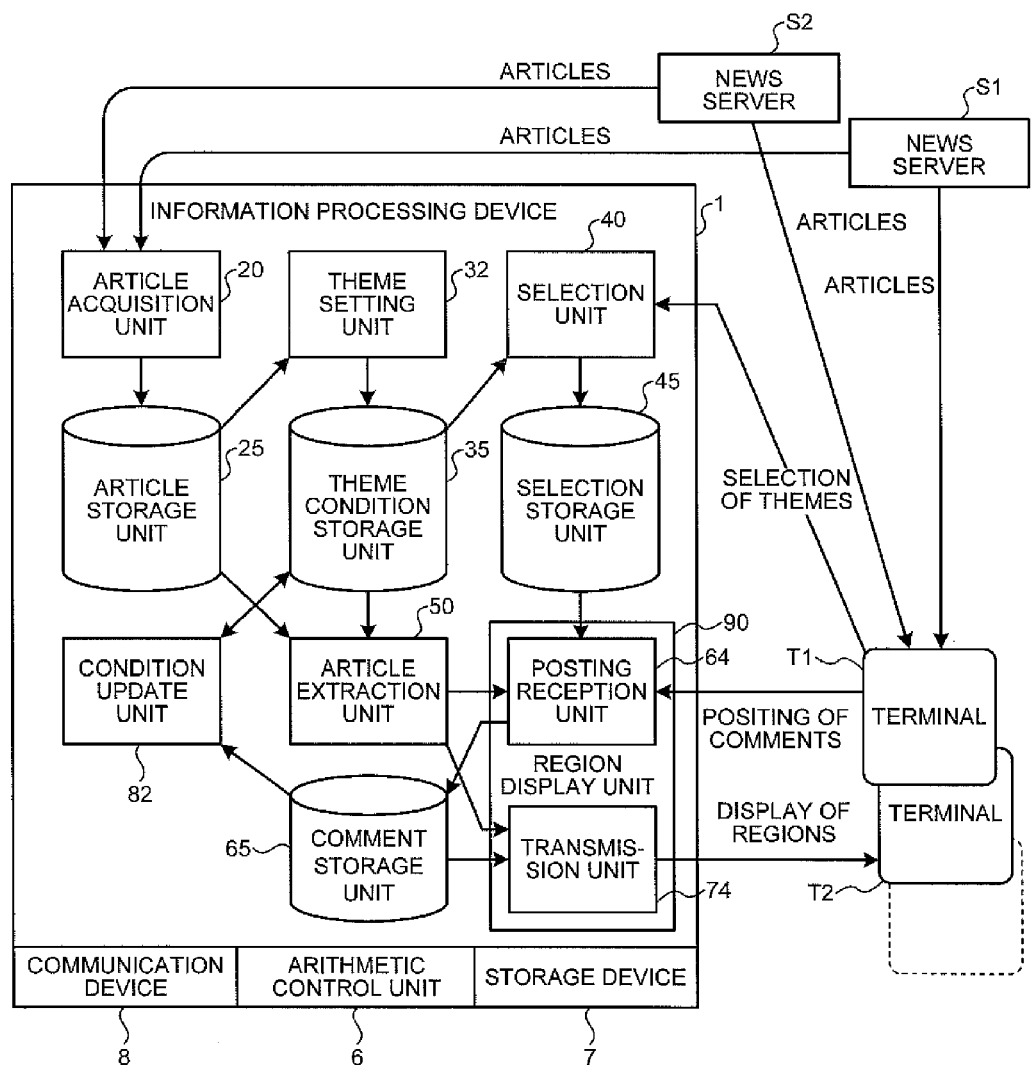
FIG. 1 is a functional block diagram illustrating a configuration according to an embodiment of the invention.

This embodiment relates to an information processing device 1 (also referred to as a "present device 1") with a configuration illustrated in FIG. 1. The present device 1 is a server device that provides comments on news articles provided from news servers S (S1, S2, and the like) to terminals T (T1, T2, and the like) used by users. The present device 1, the terminals T, and the news servers S are connected to each other via a communication network (not illustrated) (for example, the Internet or a mobile communication network of cellular phones, PHSs, public wireless LANs, or the like).

The present device 1 includes at least, an arithmetic control unit 6 such as a CPU, a storage device 7, such as main memory or an auxiliary storage device, and a communication device 8 (for example, various wireless or wired communication adapters, other communication circuits, or communication devices) communicating with a communication network (not illustrated) as a configuration of a computer.

In the present device 1, each constituent elements such as units (20, 32, and the like) illustrated in FIG. 1 are realized by causing the arithmetic control unit 6 to execute a computer program (information processing program) stored in the storage device 7. Of the realized constituent elements, an information storage unit may be realized in any data format such as files on the storage device 7. Alternatively, the information storage unit may be remote storages or the like realized by network computing (cloud).

The storage unit may include not only a data storage region but also a function such as input and output or management of data. Units of the storage units are illustrated in the description merely by way of example, and the storage units can be divided or integrated as appropriate. Further, besides the storage units specifically described in the description, additional storage units may be employed to store processed data, processed results, or the like.

An arrow in the drawing (for example, FIG. 1) indicates a main direction of flow of data, control, or the like in an auxiliary manner and does not mean negation of another flow or limitation to a direction. For example, before and after data is acquired in a given direction, a data request or a response of acknowledgement (ACK) can be generated in an opposite direction thereto.

Respective units other than the storage unit are processing units that realize and perform a functional process (for example, FIG. 1) of the information processing to be described below. However, the units are functional units for the description thereof, and thus may not accord with actual hardware elements or software modules.

2. Overview of Processes

Figure 2:
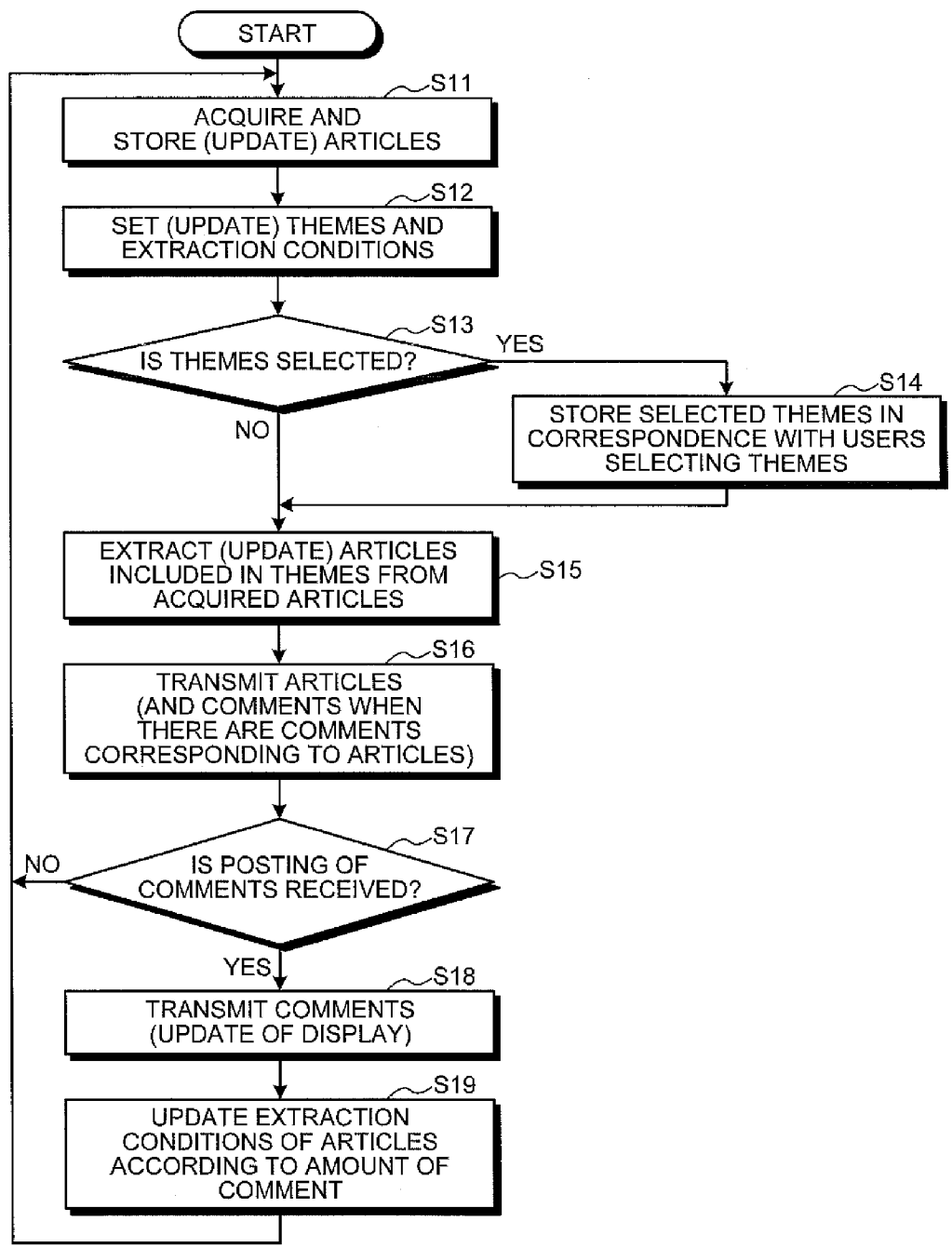
FIG. 2 is a flowchart illustrating a processing order according to the embodiment of the invention.

Processes particularly relevant to the embodiment in the processes performed by the present device 1 with the above-described configuration are illustrated in the flowchart of FIG. 2.

2-1. Setting of Theme and Reception of Follow

First, an article acquisition unit 20 acquires articles indicated as data from supply sources (for example, the news servers S1 and S2 or the like) (step S11) and stores the articles in an article storage unit 25 (for example, FIG. 3). The acquisition may be update of the acquired data.

A theme setting unit 32 sets themes and extraction conditions (for example, FIG. 4) of the articles included in themes based on at least one of the acquired articles (step S12). This setting may be addition, change, or deletion of the set themes or the set extraction conditions. To automatically set the themes, keywords or hashtags assigned in advance to the supplied articles by the supply sources are used or commonality of characteristic words extracted from titles or texts of the respective articles by a language processing technology such as tf-idf, a clustering technology, or the like is used.

For example, characteristic words appearing in all of given article groups may be set to themes of the article groups. Further, extracted common characteristic words may be set as extraction conditions. Of the articles corresponding to the themes, words or a pair of words appearing at a predetermined ratio (for example, 50 percents) may be considered to be set as the extraction condition. FIG. 4 illustrates an example in which a theme ID, a title, and extraction conditions are stored for each theme in a theme condition storage unit 35. The themes or the extraction conditions may be set by the theme setting unit 32 through a received operation of a human.

A selection unit 40 receives selection (also referred to as "follow") of the set theme from a user (step S13) and stores the followed theme in a selection storage unit 45 (for example, FIG. 5) in correspondence with a user (also referred to as a "follower") following the followed theme (step S14). The selection is performed, for example, by checking a desired theme among a list of the themes on a selection screen and pressing a registration button or clicking the theme itself displayed on the screen (not illustrated).

Figures 6, 7:
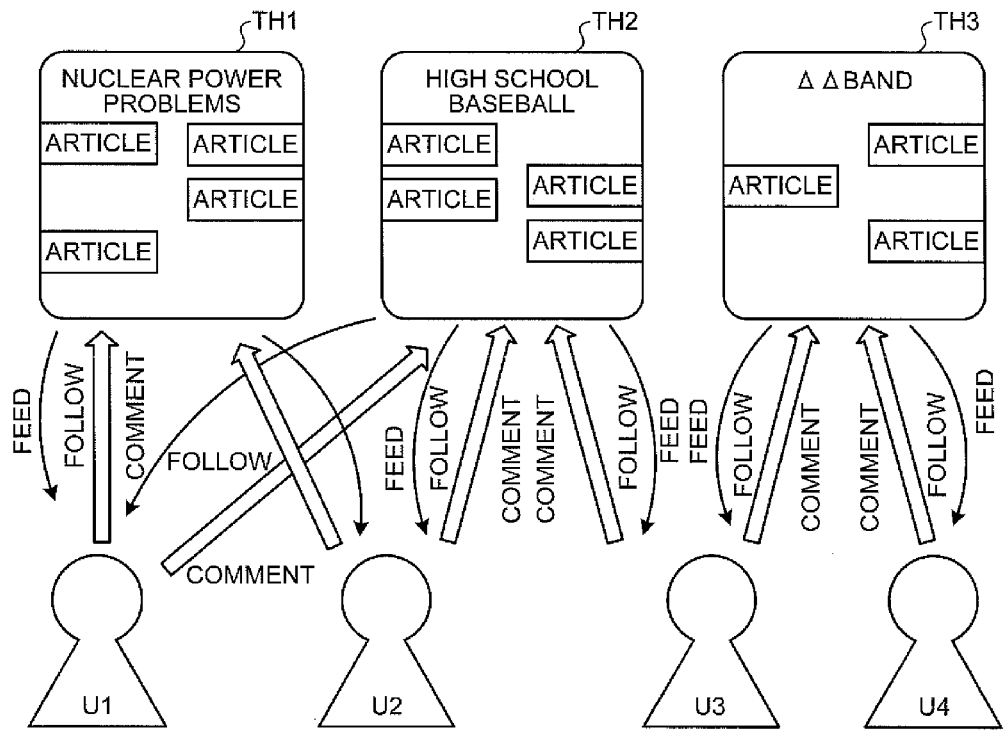
FIG. 6 is a conceptual diagram illustrating follow according to the embodiment of the invention.
FIG. 7 is a diagram illustrating an example of data according to the embodiment of the invention.

The selection unit 40 receives the follow of any number of themes from each user and receives cancellation of the follow through a predetermined operation at anytime. In the example of FIG. 6, thick arrows with a void oriented upward or obliquely indicate follow of themes by users and posting of comments on articles included in the themes. Oppositely curved arrows indicate feed (transmission) of articles and comments included in the themes for followers of the themes.

Here, characters are not illustrated in some of the arrows in FIG. 6. As exemplified in FIG. 6, each user can follow at least one of the themes simultaneously by any number, and the number of followers for each theme is not limited. In FIG. 6, users U1 and U2 follow each number and a combination of themes among themes TH1 to TH3.

2-2. From Extraction of Articles to Transmission of Comments

Next, an article extraction unit 50 extracts articles included in the set themes from the articles acquired by the article acquisition unit 20 based on the extraction conditions according to the themes (step S15). At this time, a transmission unit 74 can transmit the articles extracted according to the themes to the followers of the themes (step S16).

A correspondence relation between the themes and the articles extracted for the themes by the article extraction unit 50 may be indicated by independent contrast data, as in FIG. 7, and at least one theme including the article may be recorded as a theme ID in a data item (not illustrated) provided in the article storage unit 25 (FIG. 3).

In the transmission of the articles, an article may be stated in each theme for a user who has not yet follow the theme and may be transmitted, and the follow of the interesting theme may be received, and then an article or a comment of the theme which the user follows may be transmitted to the user in the format other than RSS feed.

A posting reception unit 64 receives posting of the comments on the articles extracted by the article extraction unit 50 and transmitted by the transmission unit 74 from followers of the themes including the articles (step S17) and stores the posted comments in a comment storage unit 65 (for example, FIG. 8). The transmission unit 74 transmits the posted comments together with the corresponding articles to the followers of the themes including the articles (step S18 or S16).

Specifically, the posted comments may be transmitted immediately, for example, by updating display in a form added to the display (step S18) and may be transmitted at a timing at which subsequent articles and comments are transmitted (step S16). A range of the users admitting the posting of the comments corresponding to the articles may be limited or may not be limited to the follower.

2-3. Display of Comment Exchange Region

Figure 9:
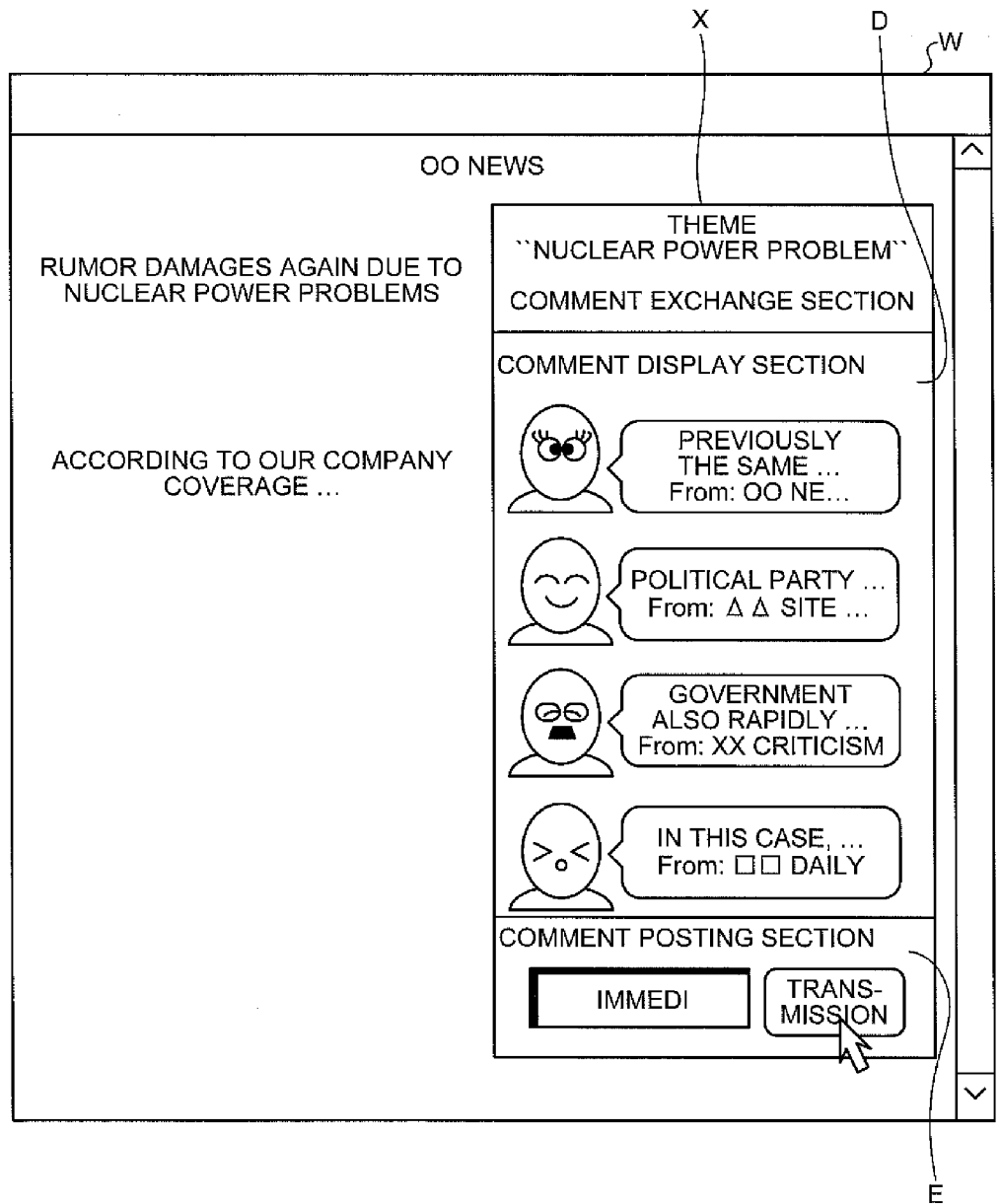
FIG. 9 is a diagram illustrating a screen display example according to the embodiment of the invention.

Here, the posting of the comments or the display and browsing of the transmitted comments may be performed through a comment exchange region X displayed on a web page W of the articles, as in an example of FIG. 9. In this case, a region display unit 90 displays the comment exchange region X including a display region D and a posting section E of the comments on the web page W of the articles included in the themes.

To embed the comment exchange region X into the web page W, a markup description of URL or the like of the comment exchange region X provided by the present device 1 is included in a source code of the web page W according to a web advertisement or a blog part in a web server (for example, the news server S1 or S2 in FIG. 1) providing the web page W.

Thus, a web browser (not illustrated) of the terminal T can receive portions of the articles or the like on the web page W from, for example, the news server S, receive portions of the exchange region X from the present device 1, combines the portions of the articles and the portions of the exchange region X, and display the web page W including the exchange region X.

At this time, when the above-described markup description is included in a web page of all of the articles of a given news site, the side of the present device 1 can transmit the exchange region X according to the themes including the articles included in an individual web page and display the exchange region X on the web page W.

Then, the posting reception unit 64 receives the comments on the articles of the web page from the users selecting the themes in the posting section E, and the transmission unit 74 displays the comments posted for the articles included in the themes from the followers of the themes together with link information (underlined portions in FIG. 9) used to access the corresponding articles on the display region X.

Figure 10:
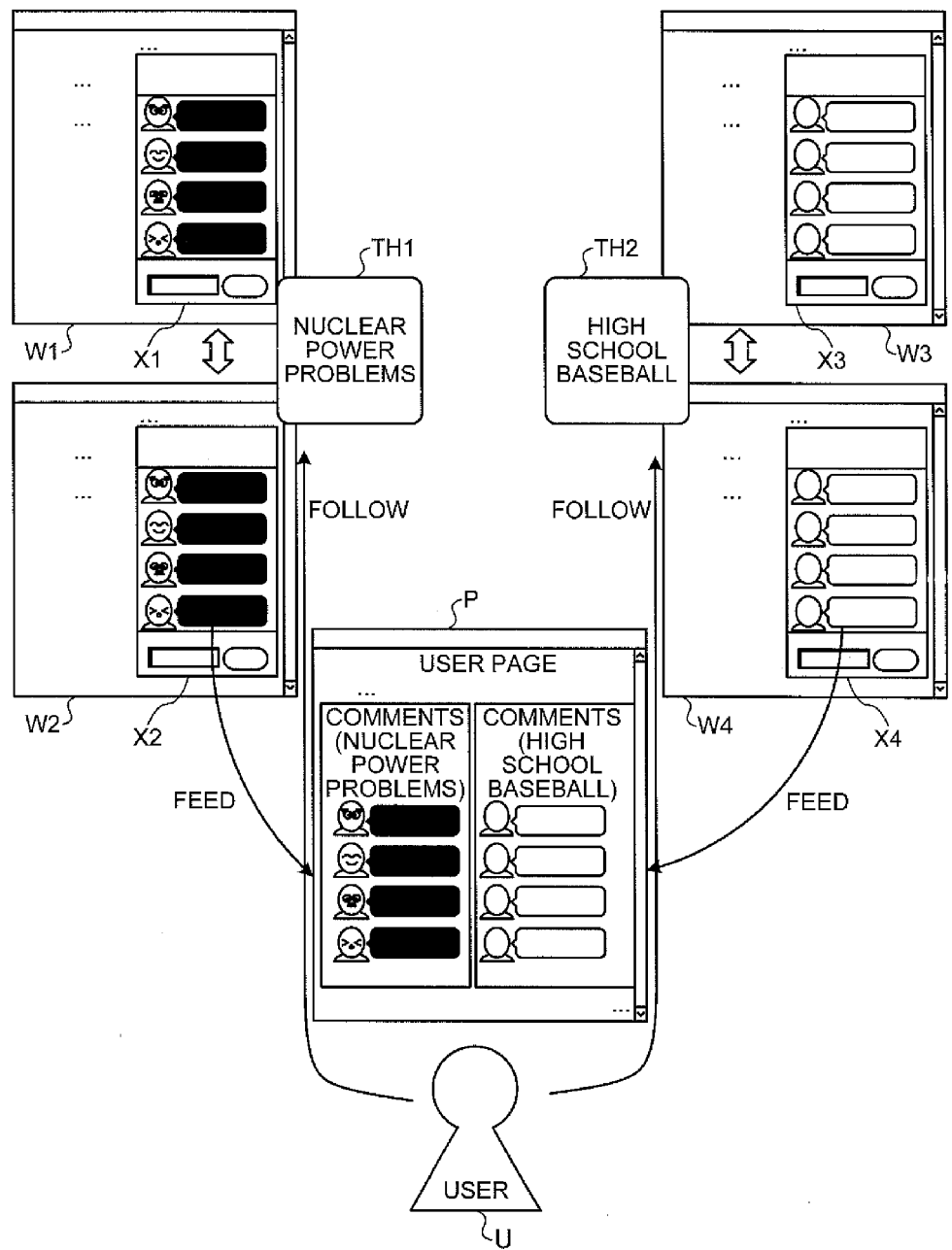
FIG. 10 is a conceptual diagram illustrating a relation among a theme, a web page, and a user according to the embodiment of the invention.

In an example of FIG. 10, for example, comment exchange regions X1 and X2 common mutually in contents are respectively displayed on web pages W1 and W2 of the articles included in theme TH1, "nuclear power problems." Further, comment exchange regions X3 and X4 common mutually in contents are respectively displayed on web pages W3 and W4 of the articles included in another theme TH2, "high school baseball."

New comments posted for the article of the web page W1 through the comment exchange region X1 from the followers of the theme including the article are displayed also in the comment exchange region X2 of the web page W2.

For a user U simultaneously following both of theme TH1 (nuclear power problems) and theme TH2 (high school baseball), not only articles or the like of other news but also comments (indicated by black balloons in the drawing) on theme TH1 (nuclear power problems) and comments (indicated by contour balloons in the drawing) on theme TH2 (high school baseball) are displayed on an individual user page P provided by the present device 1 by the data feed or the like using RSS.

2-4. Update Example of Extraction Conditions

A condition update unit 82 updates the extraction conditions of the articles corresponding to the themes according to the amount of comment posted for each article (step S19). As a specific example, a case in which the theme setting unit 32 sets at least one keyword as the extraction condition of a given theme will be considered.

For example, when at least one of the keywords "harmful rumor" and "measurement" is included in a title or an article text, the article is assumed to be an article included in the theme and extracted. In this case, the extraction conditions may be updated as follows.

First, when a keyword (for example, "measurement") is included in a number of articles equal to or greater than a predetermined second reference value (for example, a half or more), among articles included in the themes and for which an amount of comment posted is equal to or less than a predetermined reference value (for example, equal to or less than ¼ of an average comment ratio indicating the average ratio of the number of comments to the total number of browses), if the keyword is included in the extraction condition, the condition update unit 82 excludes the keyword from the extraction conditions.

Thus, in an article group with small comments among the articles included in the themes, the keyword which is common to some extent and is a basis of the extraction can be excluded.

On the contrary, when a keyword (for example, a "provisional reference") included in a number of articles equal to or greater than a predetermined second reference value (for example, 60% or more), among articles included in the themes and for which an amount of comment posted is equal to or greater than a predetermined reference value (for example, equal to or greater than the double the average comment ratio indicating the average ratio of the number of comments to the total number of browses), if the keyword is not included in the extraction condition, the condition update unit 82 adds the keyword to the extraction conditions.

Thus, in an article group with large comments among the articles included in the themes, the keyword which is common to some extent and is included can be added to the extraction conditions. Further, when a keyword to be excluded from or added to the extraction condition, as described above, and an article for which whether to be included in the theme is changed by the exclusion or the addition are displayed for the followers, votes for pros and cons are received, and the exclusion or the addition is performed according to the aggregation result, accuracy of the exclusion or the addition is improved.

3. Advantages (1) In the above-described embodiment, themes including articles and the extraction conditions of the articles included in the themes are set from articles such as news (for example, FIG. 4) and the selection of the themes are received from users. Then, posting of comments on the articles included in the themes are received from the users (for example, FIG. 8)

and the comments are transmitted to be supplied to other users selecting the same themes together with the articles. Then, the extraction conditions of the articles are updated according to the amount of comment on the articles.

Thus, when interesting themes are selected, the articles included in the themes and the comments can be browsed. Further, since the amount of comment on each article is fed back to the extraction conditions of the articles according to the themes, the articles or comments suitable for the actual interests and concerns can be easily browsed.

(2) In particular, in this embodiment, when the extraction condition is updated (step S19), a keyword that is included in many articles for which an amount of posted comments is small is excluded from the extraction condition, if the keyword is included in the extraction condition. Thus, an article for which an amount of posted comments is small and which is less likely to match the interest and concern of the user who selects the theme can be excluded.

(3) In this embodiment, when the extraction condition is updated (step S19), a keyword that is included in many articles for which an amount of posted comments is large is added to the extraction condition, if the keyword is not included in the extraction condition. Thus, an article for which an amount of posted comments is large can be extracted intensively.

(4) In this embodiment (FIG. 9), the comment exchange region X is displayed on a web page of the article included in the theme, posting of the comments on the article of the web page is received on the posting section E of the exchange region, and the comments corresponding to the article in addition to comments corresponding to another article of the same theme are displayed in the display region D together with link information used to access the article.

Thus, the comments can be easily exchanged between the users selecting the same theme through the exchange region displayed in a web page of the articles included in the themes, and other articles included in the same theme can be easily browsed.

4. Other Embodiments

The above-described embodiment is merely an example and the present invention includes embodiments to be exemplified below and other embodiments. For example, the update of the extraction conditions of the articles corresponding to the themes according to the amount of comments posted on each article is not essential, but may be omitted. Even in this case, when an interesting theme is selected, articles and comments included in the theme, that is, suitable for the actual interests and concerns can be browsed.

Each aspect may be comprehended as another non-stated category (a method, a program, a system including terminals, or the like). In the category of the method or the program, the "unit" described in the category of the device is appropriately replaced with a "process" or a "step." An order of processes or steps is not limited to the order directly stated in the present application, but the order may be changed or the processes may be changed. For example, some of the processes may be summarized or the processes may be frequently performed in parts.

Computers such as terminals realizing and executing the individual units and the processes or steps may be common or may be different for each unit, each process or step, or each timing. Further, all or arbitrarily some of the above-described "units" may be replaced with "portions" (sections, modules, or the like).

The drawings of the configuration, the drawings of the data, the flowchart, and the like in the present application are merely examples. Presence or absence of each constituent element, the disposition of each constituent element, an order of the processing execution or the like, the specific contents, and the like can be appropriately changed. For example, the present device 1 and each news server S (S1 and S2) may be integrally configured.

An aspect for realizing individual units of the present device 1 is freely configured, and thus the configuration of the present invention may be flexibly changed. For example, functions provided by an external server may be called and realized by an API (Application Program Interface) or network computing (so-called cloud or the like). Further, each constituent element such as a unit relevant to the present invention is not limited to an arithmetic control unit of a computer, but may be realized by another information processing mechanism such as a physical electronic circuit.

According to the aspects of the invention, it is possible to provide a technology for easily browsing articles or comments actually matched with interests and concerns.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a memory; and
a processor configured to:
acquire articles indicated as data;
assign a primary characteristic keyword and a secondary set of extraction conditions to a group of the acquired articles belonging to a theme, the primary characteristic keyword appearing in all of the articles in the group of articles belonging to the theme, and the secondary set of extraction conditions being words and/or hashtags appearing at a predetermined ratio among the group of articles belonging to the theme;
receive a selection of the theme by a user;
extract an article included in the group of articles based on one of the secondary set of extraction conditions of the theme;
receive a posting of a comment corresponding to the extracted article;
transmit the posted comment to the user selecting the theme including the article; and
update the secondary set of extraction conditions of the group of articles belonging to the theme according to an amount of comment posted for each of the articles.

2. The information processing device according to claim 1, wherein the processor is further configured to:
assign at least one keyword to the secondary extraction conditions of the group, and
when: (i) a keyword is included in a number of articles equal to or larger than a predetermined first reference value among articles of the group, and for which an amount of comments posted is equal to or smaller than a predetermined second reference value, and (ii) the keyword is included in the secondary extraction conditions of the group, exclude the keyword from the secondary extraction conditions of the group.

3. The information processing device according to claim 1, wherein the processor is further configured to:
assign at least one keyword to the secondary extraction conditions of the group, and when (i) a keyword is included in a number of articles equal to or larger than a predetermined first reference value among articles of the group, and for which an amount of comments posted is larger than a predetermined second reference value, and (ii) the keyword is not included in the secondary extraction conditions of the group, add the keyword to the secondary extraction conditions of the group.

4. The information processing device according to claim 1, wherein the processor is further configured to:
   display a comment exchange region including a comment display region and a posting section on a web page of an article included in the group belonging to the theme,
   receive the comment on the article from the user, the user selecting the theme in the posting section, and
   display the comment posted to the article included in the group belonging to the selected theme in the display region together with link information used to access the corresponding article.

5. The information processing device according to claim 1, wherein the processor is further configured to:
   display a comment exchange region including a comment display region and a posting section on a web page of an article included in the group belonging to the theme,
   receive the comment on the article from the user, the user selecting the theme in the posting section, and
   control a terminal of the user, who selects an article, to display comments posted to the selected article and comments posted to other articles included in the group belonging to the theme, the other articles being articles that are not displayed on the terminal of the user.

6. An information processing method causing a computer to execute steps comprising:
   acquiring articles indicated as data;
   assigning a primary characteristic keyword and a secondary set of extraction conditions to a group of the acquired articles belonging to a theme, the primary characteristic keyword appearing in all of the articles in the group of articles belonging to the theme, and the secondary set of extraction conditions being words and/or hashtags appearing at a predetermined ratio among the group of articles belonging to the theme;
   receiving a selection of the theme by a user;
   extracting an article included in the group of articles based on one of the secondary set of extraction conditions of the theme;
   receiving a posting of a comment corresponding to the extracted article;
   transmitting the posted comment to the user selecting the theme including the article; and
   updating the secondary set of extraction conditions of the group of articles belonging to the theme according to an amount of comment posted for each of the articles.

7. The information processing method according to claim 6, wherein the method steps further comprise:
   displaying a comment exchange region including a comment display region and a posting section on a web page of an article included in the group belonging to the theme,
   receiving the comment on the article from the user, the user selecting the theme in the posting section, and
   controlling a terminal of the user, who selects an article, to display comments posted to the selected article and comments posted to other articles included in the group belonging to the theme, the other articles being articles that are not displayed on the terminal of the user.

* * * * *